April 23, 1957
E. E. PRICER
2,790,060
SOLDERING IRON
Filed Nov. 15, 1955
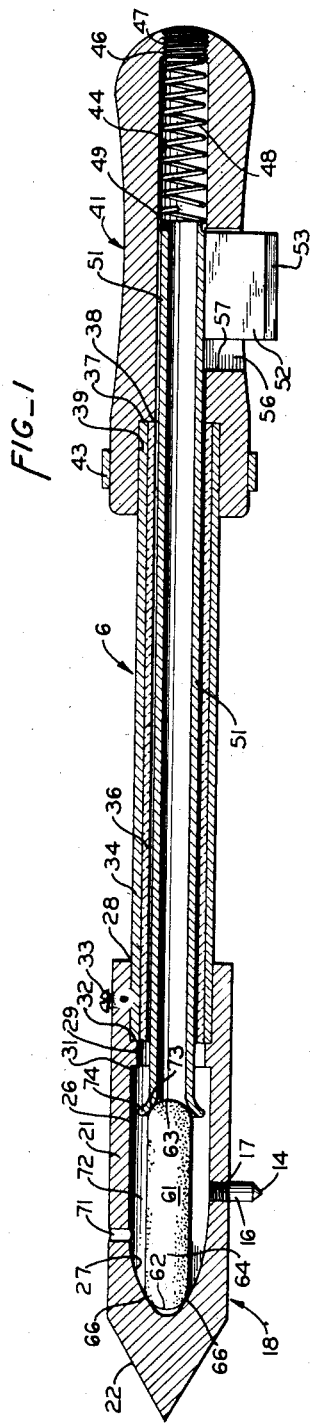
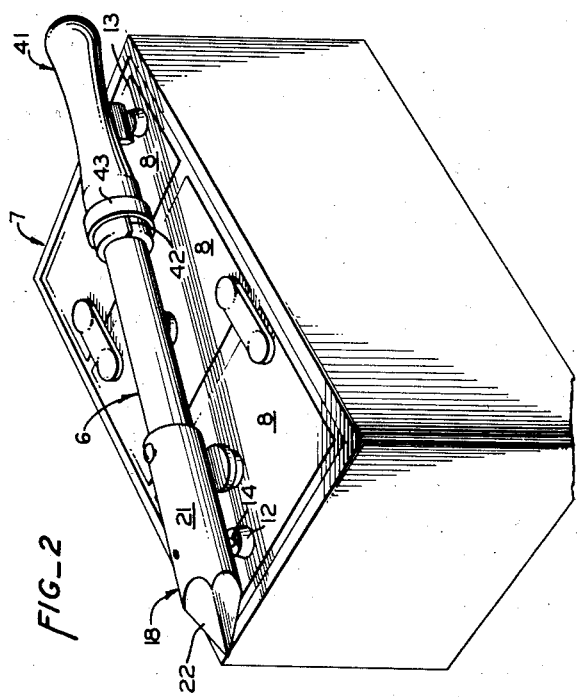
INVENTOR.
EDGAR E. PRICER
BY
Lothrop + West
ATTORNEYS

United States Patent Office 2,790,060
Patented Apr. 23, 1957

2,790,060

SOLDERING IRON

Edgar E. Pricer, Sacramento, Calif.

Application November 15, 1955, Serial No. 546,954

1 Claim. (Cl. 219—26)

The invention relates to electrically heated soldering irons and more particularly to soldering irons adapted to receive electrical energy directly from the terminals of a storage battery, and to remain in heated condition for a substantially long period of time, even though removed from the electrical energy source.

While storage batteries, for example, batteries of the kind found in every automobile, have long been utilized as a source of electrical energy to heat soldering irons, the irons heretofore used contemplate a constant heating and thus a continuous supply of iron-heating current. Where an iron of the continuous current type is put to use at a location remote from the battery, electrical conductors, such as insulated wire, become necessary, the use of wire being attended by the usual difficulties such as kinking, entangling, etc.

It is therefore an object of the invention to provide a soldering iron which eliminates the need for any of the conventional conductors and connectors such as wires, clips, etc., which frequently form poor connections and become entangled in use.

It is another object of the invention to provide a soldering iron which can be used in an emergency situation where no conventional sources of electrical energy such as dwelling-house or shop circuits are available.

It is yet another object of the invention to provide a soldering iron which is heated in a rapid fashion and at a location highly convenient, for example, to a garage mechanic.

It is still another object of the invention to provide a soldering iron which has but few moving parts to get out of order and which is safe and durable yet relatively inexpensive.

It is a further object of the invention to provide a soldering iron which, although quickly heated to working temperature, retains its heat for extended periods of time although removed from the battery heating source and which can therefore be used at a location considerably distant from the battery, if necessary.

It is a still further object of the invention to provide a soldering iron which remains at a high level of efficiency throughout its life.

It is a yet further object of the invention to provide a soldering iron which enables the user to observe visually the heating effect of the electrical energy.

It is another object of the invention to provide a soldering iron which can be used with batteries which have even badly corroded terminals.

It is yet another object of the invention to provide a generally improved soldering iron.

Other objects, together with the foregoing, are attained in the embodiment described in the following description and shown in the accompanying drawing in which Figure 1 is a longitudinal median section of the soldering iron.

Figure 2 is a perspective of the iron located on and undergoing heating from a typical automobile, truck or tractor type of storage battery.

While the soldering iron of my invention is susceptible of numerous physical embodiments depending upon the environment and usages to which it is to be put, a number of the herein shown and described embodiments have been made and used and have performed in an eminently satisfactory fashion.

Most conveniently, the source of electrical energy used to heat the soldering iron, generally designated by the numeral 6, is a storage battery 7 comprising a plurality of cells 8 connected in series to provide across its terminals 12 and 13 a voltage of predetermined amount, frequently either six or twelve volts, and a current of substantial rate.

While the direct current provided by the battery will furnish substantially the same heating effect regardless of the direction of current or electron flow through the iron, it will be assumed that in the drawing the terminal 12 is the negative terminal and the terminal 13 is the positive terminal. In this event, current flow takes place from the terminal 12 through a sharpened point 14 of a threaded bolt 16 in secure engagement with a tapped transverse hole 17 in a soldering tip 18. The sharp point 14 is capable not only of piercing layers of grease, corrosion, etc., frequently covering the lead terminal 12, but also of penetrating some depth into the terminal itself, thus assuring a clean, low resistance contact with the terminal.

The soldering tip 18 illustrated is ordinarily made from a bar of copper, and, for heavy-duty work, frequently assumes the exterior configuration shown, namely, a projectile-shaped member comprising a cylindrical housing 21, or shell, with a tapered point 22. Often, however, the point 22 is caused to assume configurations other than the taper and which are especially adapted to reach into restricted areas and to impart the heat of the tip to wires or other surfaces in locations not readily reachable by the conventional taper shown.

In any event, the tip is provided with a central bore 26 substantially coaxial with the shell 21, the bore terminating at its forward end in a parabolic-shaped wall 27 and interrupted adjacent its rearward opening 28 by a collar 29, or choke, providing a forward shoulder 31 and a rearward shoulder 32. Abutting the rearward shoulder 32 and held in place by a set-screw 33 is a sleeve 34 of a material, such as copper, within which is located in close fit a ceramic or other insulating sleeve 36. The length of the sleeves 34 and 36 determines the length of the iron, the rear ends 37 and 38 respectively, of the sleeves abutting the rear wall of a large bore 39 in a wooden or plastic handle 41. Preferably a longitudinal slit 42 in the handle adjacent the large bore 39 is provided, the slit enabling a circular band 43 to be clamped and to compress tightly the portion of the handle encircling the sleeves 34 and 36 so as to hold the sleeves firmly in position in the handle.

Coaxial with the large bore 39 in the handle is a small bore 44 having a threaded portion 46 adjacent its rearward end adapted to receive a threaded plug 47. Against the base of the plug bears a helical spring 48 which bears, in turn, against a shoulder 49 in the rearward end of a copper tube 51, or sleeve, slidably disposed within the small bore 44 and within and slightly spaced radially from the ceramic sleeve 36.

Transversely mounted on the rearward portion of the tube 51 is an elongated metallic, preferably copper, block 52 or contact, in longitudinal alignment with the contact point 14 in the iron's tip and sharpened to a knife-edge 53 to cut through the foreign matter customarily found on battery terminals and into the lead of the positive terminal 13, as shown in Figure 2. An elongated transverse slot 56 extending longitudinally through the handle to the small bore 44 accommodates the contact block 52, allowing the block to translate, under urgency of the spring 48, from the position of the block shown in Figure 1 forwardly and until the block abuts the forward wall 57 of the slot 56.

Opposing the tendency of the tube 51 to move, under spring urgency, toward a left-hand direction, as appears in Figure 1, is an intervening electrical resistance and heat reservoir member 61, preferably of carbon and assuming the shape of a rod smoothly rounded to a substantially arcuate configuration adjacent its forward end 62 and rearward end 63, and being symmetrical about the longitudinal axis 64 of the tip bore 26.

The shape of the parabolic forward wall 27 of the tip bore 26 bears a predetermined relation with respect to the shape of the forward arcuate end 62 of the carbon rod, the relation being such that the area of contact 66 assumes the shape of a band having a width somewhat greater than a mere circular line of contact. The area of contact is small enough, however, to create across the contact band 66 a substantial resistance to the flow of current and thus to create adjacent the band 66 an area of localized heat, the heat being quickly conducted to all portions of the point 22 and thus rendering the iron ready to use within a very short time. The band of contact 66 is wide enough, however, to permit heat to flow from the carbon rod 61 into the copper tip, and into the soldering point 22 thereof, at a predetermined desired rate.

The resistance offered by the carbon rod is such that approximately 70 amperes are drawn from the usual car battery. When such current rate is continued for the sixty to one hundred and twenty seconds required to heat the heavy duty iron illustrated, the carbon rod is heated to substantially a white heat, observable through a peephole 71 in the tip shell.

The rod 61 thus serves not only to bring the iron up to working temperature initially but also acts as an efficient heat reservoir (carbon having a high specific heat, or heat content) serving to keep the soldering tip at a high temperature long after the iron is removed from the battery. The contact band 66 provides sufficient area, in other words, to transfer heat from the carbon rod heat reservoir to the tip at a rate sufficient to maintain the tip at necessary working temperature, but not at an excessive rate which would shortly exhaust the heat content of the hot carbon rod. It is especially to be noted that the surface of the carbon rod is, except at the contact portions insulated from the adjacent shell wall by a dead air space 72, thus substantially eliminating loss of heat from the rod by conduction and even by convection. In this regard, especially, the device herein marks an important advance over the art heretofore known.

The rearward arcuately formed end 63 of the rod is in substantially circular line contact 73 with a flared mouth 74, or bell mouth, at the forward end of the copper tube 51. While the circular line contact 73 between the rod end 63 and the bell mouth 74 is adequate to complete the circuit between the battery terminals, the line contact 73 is substantially less in width or area than the band of contact 66 adjacent the tip of the iron. Consequently, the flow of non-useful heat from the rod into the bell mouth is reduced to a minimum whereas useful, temperature maintaining heat is allowed to flow into the tip.

As the carbon electrode and heat reservoir slowly wears away, adjacent its ends, the bell mouth continues to urge against the rod electrode by virtue of the spring 48, so as to compensate for the wear and continuously to keep the rod in its centered or coaxial position. Owing to the bell mouth shape of the tube 51 and the parabolic form of the bore end wall 27 the carbon rod is held by spring force in a substantially centered location despite any initial chance misalignment of the rod and is, furthermore, held in proper position regardless of wear and despite shocks or vibrations.

It can therefore be seen that I have provided a soldering iron which is not only free of the customary entangling conductor wires and which heats quickly to proper soldering temperature, but which also remains at such temperature for extended lengths of time even though the iron is removed to a location distant from the energy source.

What is claimed is:

A soldering iron comprising an elongated tip having an interior bore for a portion of its length, a carbon rod rounded to predetermined configurations at each end, one end of said rod being in contact with said tip at the inner end of said bore, a conducting sleeve extending into said bore and having a bell mouth at its innermost end, said bell mouth being in contact with the other end of said rod to support said rod centrally within said bore, a first contact point on said tip, a second contact point on the end of said sleeve distant from said tip, and a handle encompassing said sleeve.

References Cited in the file of this patent

UNITED STATES PATENTS

| | | |
|---|---|---|
| 1,533,959 | Wagner | Apr. 14, 1925 |
| 1,571,836 | Hockersmith et al. | Feb. 2, 1926 |
| 2,036,169 | Beleson | Mar. 31, 1936 |
| 2,692,935 | Pearce et al. | Oct. 26, 1954 |

FOREIGN PATENTS

| | | |
|---|---|---|
| 550,333 | Great Britain | Jan. 4, 1943 |
| 574,498 | Great Britain | Jan. 8, 1946 |